United States Patent [19]

Atwell, Jr.

[11] Patent Number: 5,350,220
[45] Date of Patent: Sep. 27, 1994

[54] VEHICLE WHEEL WITH BALANCE WEIGHTS

[75] Inventor: Robert J. Atwell, Jr., Washington, Mich.

[73] Assignee: Chrysler Corporation, Highland Park, Mich.

[21] Appl. No.: 155,664

[22] Filed: Nov. 22, 1993

[51] Int. Cl.⁵ .............................................. B60B 21/02
[52] U.S. Cl. ...................................... 301/5.21; 301/65
[58] Field of Search .......................... 301/5.21, 5.22, 65

[56] References Cited

U.S. PATENT DOCUMENTS

| | | | |
|---|---|---|---|
| 1,896,974 | 2/1933 | Sailler | 301/5.21 |
| 2,304,816 | 12/1942 | Griffith | 301/5.21 |
| 3,273,941 | 9/1966 | Skidmore | 301/5.21 |
| 3,799,618 | 3/1974 | Martinoli | 301/5.21 |
| 5,271,663 | 12/1993 | Maldini et al. | 301/5.22 |

FOREIGN PATENT DOCUMENTS

| | | | |
|---|---|---|---|
| 717798 | 2/1942 | Fed. Rep. of Germany | 301/5.21 |
| 1114880 | 4/1956 | France | 301/5.21 |

*Primary Examiner*—Russell D. Stormer
*Attorney, Agent, or Firm*—Edward A. Craig

[57] ABSTRACT

A wheel construction is provided. It is preferably made of a lightweight material such as aluminum or magnesium. The wheel has a wheel body and a rim, with balance weights on the axially inner side of the wheel body in positions such that they cannot be seen from the axially outer side of the wheel. The balance weights are releasably secured to two circular flanges on the radially inner surface of the rim. The flanges are located on opposite sides of the centerline of the wheel to achieve both static and dynamic balance. The balance weights may be of the saddle-type having two weights so that a weight is on both sides of the flange.

7 Claims, 2 Drawing Sheets

VEHICLE WHEEL WITH BALANCE WEIGHTS

This invention relates generally to automotive vehicle wheels with balance weights and more particularly to balance weight attachment and location.

BACKGROUND AND SUMMARY

Balance weights when mounted on a flange on the outside of an automotive vehicle wheel detract from the appearance of the wheel. The mounting flange also limits the radial extent of the basic wheel body configuration, or graphics, and this further affects overall design appearance.

In accordance with this invention, the balance weights are located on the inner side of the wheel body, eliminating the need for a mounting flange on the outer side. As a result, the wheel body graphics, including spokes, if any, can be extended out to the edge of the rim, giving the appearance of a larger, more attractive wheel. The appearance of the wheel is further enhanced by the absence of balance weights on the outer side.

The wheel structure preferably has a pair of circular flanges on the inner side of the wheel body concentric with the axis of rotation. Preferably, the flanges are disposed on opposite sides of the centerline of the wheel with balance weights attached to the axially outer sides of the flanges in circumferentially adjusted position to achieve both static and dynamic balance.

One object of this invention is to provide a wheel structure with balance weights having the foregoing features.

A further object is to provide a wheel structure with balance weights which is composed of simple construction, is rugged and durable in use and capable of being easily and inexpensively manufactured.

Other objects, features and advantages of the invention will become more apparent as the following description proceeds, especially when taken with the accompanying drawings.

DETAILED DESCRIPTION

Figure 1:
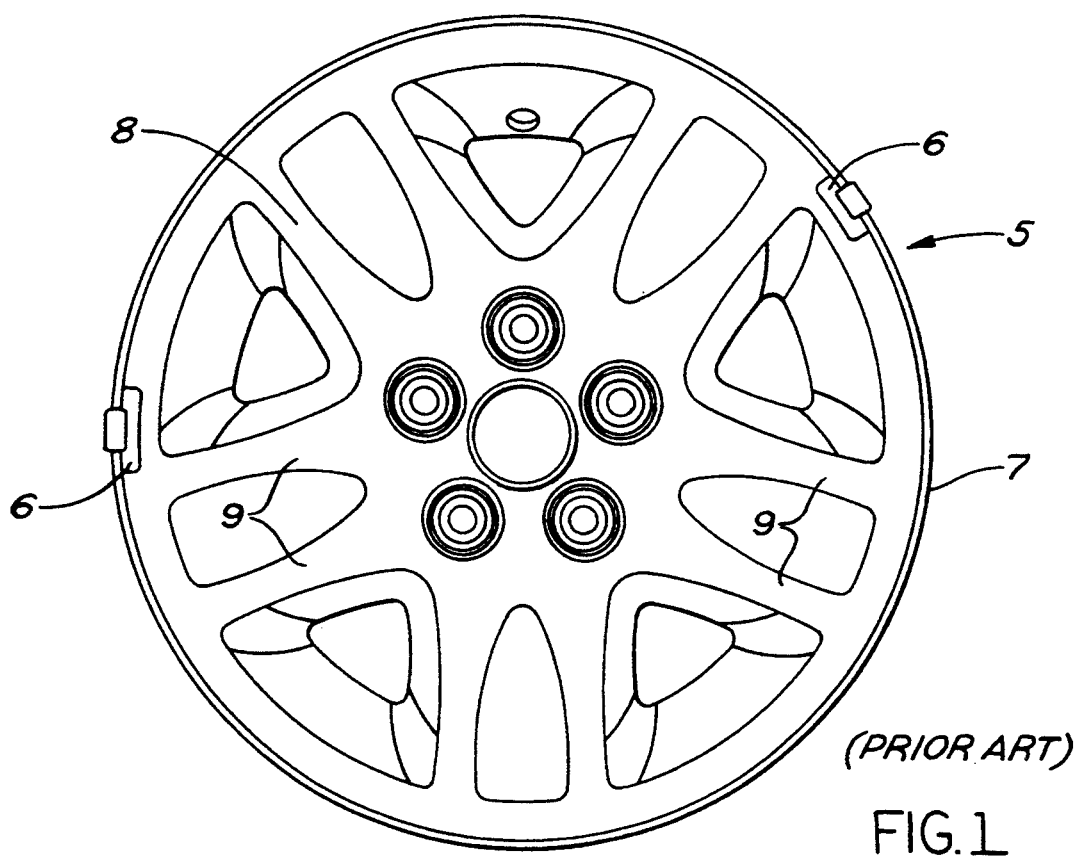
FIG. 1 is an outside elevational view of a vehicle wheel structure constructed in accordance with the prior art.

Referring now more particularly to the drawings, a wheel structure 5 constructed in accordance with the prior art is shown in FIG. 1, seen from the axially outer side. Balance weights 6 are shown attached to a circular mounting flange 7 on the outer edge of the body 8 of the wheel structure. The presence of balance weights is unattractive, and the mounting flange limits the overall length of the spokes 9 and makes the wheel appear somewhat smaller than it actually is.

Figure 2:
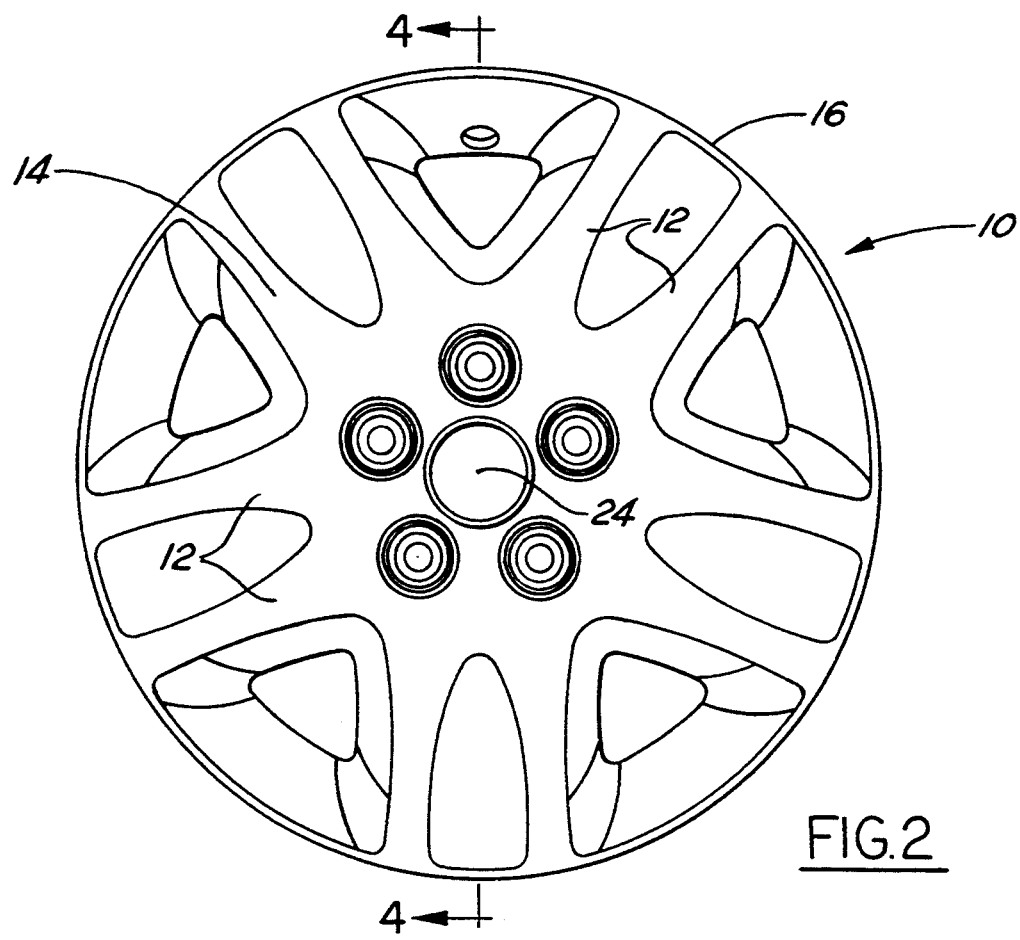
FIG. 2 is an outside elevational view of a wheel structure constructed in accordance with the invention.

FIG. 2 shows the axially outer side of a wheel structure 10 constructed in accordance with the invention. There is no mounting flange similar to flange 7 in FIG. 1 on the outer side of the wheel, so that the ornamental and design graphics, including spokes 12, of the wheel body 14 may be continued radially outwardly almost to the outer edge of the wheel. This makes the wheel look larger overall and more attractive, and the balance weights on the outer side are eliminated altogether.

Figure 3:
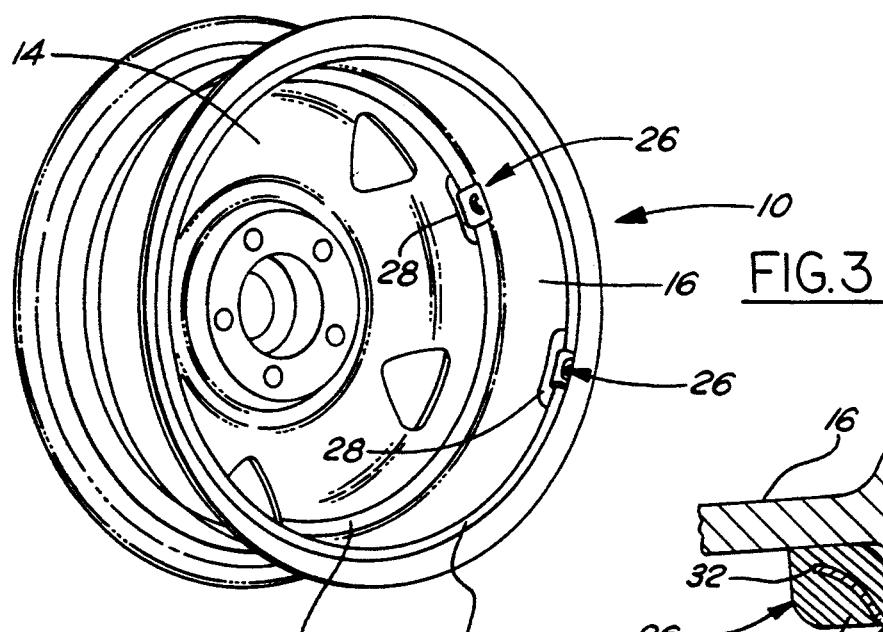
FIG. 3 is a perspective view of the wheel structure shown in FIG. 2, as seen from the axially inner side.

FIG. 3 shows the wheel or wheel structure 10 from the axially inner side. The wheel 10 is of integral one-piece construction and is preferably made of a relatively lightweight material such as aluminum or magnesium. The wheel body 14 extends generally radially. A generally axially extending rim 16 encircles the wheel body 14 and is integrally joined to the radially outer edge of the wheel body.

Two integral, axially spaced, circular flanges 18 and 20 project radially inwardly from the radially inner surface of the rim. These flanges are disposed on opposite sides of the centerline 22 of the wheel, the centerline being in a plane perpendicular to the central axis of rotation 24 of the wheel.

Balance weights 26 are mounted on the flanges 18 and 20 in circumferentially adjusted position. These balance weights are shown as comprising a bar or weight 28 of a relatively heavy metal such as lead and a clip 30 for releasably attaching the weight 28 to one of the flanges 18,20. The clip 30 may be made of spring metal and is generally U-shaped, having one end portion 32 embedded in the weight and the other end portion 34 projecting outwardly from the weight. This projecting end portion 34 has an elongated slot 36 and the metal beyond the slot is slit to provide a tang 38 which is bent inwardly and is adapted to grip one side of a flange 18 or 20 with the weight securely held against the other side of the flange. Preferably, the weights 28 are attached to the axially outer sides of the flanges 18 and 20 in circumferentially adjusted positions 40 to achieve both static and dynamic balance.

Figure 4A:
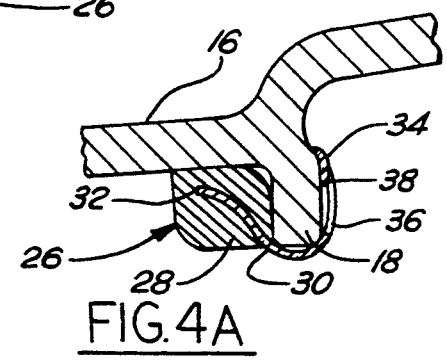
FIG. 4A is an enlarged sectional view of the portion of FIG. 4 shown within the circle 4A.
Figure 4:
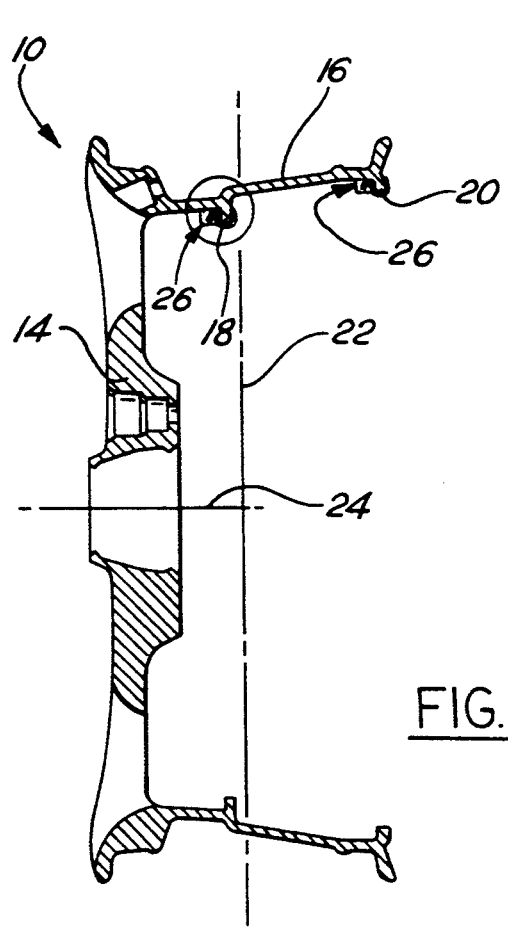
FIG. 4 is a sectional view taken on the line 4—4 in FIG. 2, showing balance weights attached to flanges on the radially inner surface of the rim.
Figure 6:
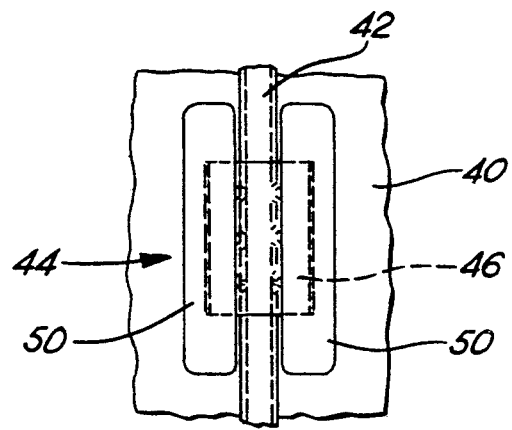
FIG. 6 is a fragmentary elevation of the structure shown in FIG. 5, as seen from below.
Figure 5:
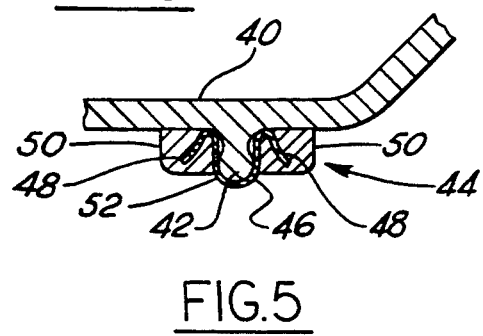
FIG. 5 is a fragmentary sectional view similar to FIG. 4A showing a portion of a rim of somewhat different configuration, with a saddle-type balance weight secured to a flange on the radially inner surface of the rim.

FIG. 5 shows a modification in which the portion of the rim 40 shown is of a slightly different configuration, but has a flange 42, similar to flanges 18 and 20, extending radially inwardly from the rim. The balance weight 44 in FIG. 5 is of the saddle-type in which a single spring clip 46 has opposite end portions 48 embedded in weights or bars 50 of lead or like relatively heavy material. The mid-portion 52 of the clip exteriorly of the weights is of generally U-shape and is adapted to snap over the flange 42. Obviously, saddle-type balance weights of the type shown in FIG. 5 may be substituted for the balance weights shown in FIGS. 3, 4 and 4A for attachment to the flanges there shown. A stated above, a weight or weights should be attached on the axially outer side of the mounting flanges, and one advantage of saddle-type balance weights over the single weight type in FIGS. 4 and 4A is that they ensure that there is always a weight on the axially outer side of the flange.

It is important that the mounting flanges for the weights be placed on opposite sides of the centerline 22 in order to obtain a proper static and dynamic balancing of the wheel.

The balance weights are obscured by the wheel body and cannot be seen when the wheel is viewed from the outer side. Also, the overall ornamental and design appearance or graphics of the wheel body, including the spokes 12, may be continued radially outwardly substantially or nearly to the outer edge of the wheel, because the mounting flange for balance weights is removed from the outer side and the balance weights are relocated to positions on the inner side of the wheel body, This makes the spokes appear longer and the wheel to appear larger and more attractive.

What is claimed is:

1. A wheel structure for an automotive vehicle comprising a generally radially extending wheel body having a central axis of rotation, a generally axially extending annular rim integral with said wheel body and extending around the radially outer periphery of said wheel body, said wheel structure having circular, first and second, axially spaced flanges on the axially inner side of said wheel body concentric with said axis of rotation, said flanges being disposed on opposite sides of the centerline of the wheel structure, a first balance weight releasably secured to said first flange in circumferentially adjusted position and a second balance weight releasably secured to said second flange in circumferentially adjusted position, said wheel structure being devoid of a balance-weight mounting flange on the axially outer side of the wheel body.

2. A wheel structure for an automotive vehicle comprising a generally radially extending wheel body having a central axis of rotation, a generally axially extending annular rim integral with said wheel body and extending around the radially outer periphery of said wheel body, said wheel structure having circular, first and second, axially spaced flanges on the axially inner side of said wheel body concentric with said axis of rotation, a first balance weight releasably secured to said first flange in circumferentially adjusted position and a second balance weight releasably secured to said second flange in circumferentially adjusted position, the axially outer side of said wheel body being devoid of a balance-weight mounting flange and the ornamental and design graphics of said wheel body being continued radially outwardly substantially to the radially outer edge of said wheel body, and said balance weights being located in positions such that they are obscured by said wheel body when said wheel structure is viewed from the axially outer side.

3. A wheel structure as defined in claim 2 wherein said flanges are disposed on axially opposite sides of the centerline of the wheel structure, and said balance weights include weights on the axially outer sides of said flanges.

4. A wheel structure as defined in claim 2, wherein said flanges are disposed on axially opposite sides of the centerline of the wheel structure, and said balance weights are of the saddle-type, each having two weights on axially opposite sides of the flange to which it is secured.

5. A wheel structure for an automotive vehicle, said wheel structure being of integral, one-piece construction and made of a lightweight material selected from the group consisting of aluminum and magnesium, said wheel structure comprising a generally radially extending wheel body having a central axis of rotation, a generally axially extending annular rim integral with said wheel body and extending around the radially outer periphery of said wheel body, said wheel structure having circular, first and second, axially spaced flanges on the axially inner side of said wheel body concentric with said axis of rotation, said flanges being integrally formed on the radially inner surface of said rim and located on axially opposite sides of the centerline of said wheel structure, a first balance weight having a weight releasably secured to the axially outer side of said first flange in circumferentially adjusted position, and a second balance weight having a weight releasably secured to the axially outer side of said second flange in circumferentially adjusted position, said balance weights being located in positions such that they are obscured by said wheel body when said wheel structure is viewed from the axially outer side, the axially outer side of said wheel body being devoid of a balance weight mounting flange and the ornamental and design graphics of said wheel body continuing radially outwardly substantially to the radially outer extremity of said wheel body.

6. A wheel structure as defined in claim 5, wherein said balance weights are of the saddle-type, each having a second weight on the axially inner side of the flange to which it is secured.

7. A wheel structure for an automotive vehicle comprising a generally radially extending wheel body having a central axis of rotation, a generally axially extending annular rim integral with said wheel body and extending around the radially outer periphery of said wheel body, said wheel structure having a circular flange on the axially inner side of said wheel body concentric with said axis of rotation, a balance weight releasably secured to said flange in circumferentially adjusted position, the axially outer side of said wheel body being devoid of a balance-weight mounting flange and the ornamental and design graphics of said wheel body being continued radially outwardly substantially to the radially outer edge of said wheel body, said balance weight being located in a position such that it is obscured by said wheel body when said wheel structure is viewed from the axially outer side.

* * * * *